(12) United States Patent
Kharul et al.

(10) Patent No.: US 9,200,118 B2
(45) Date of Patent: Dec. 1, 2015

(54) QUATERNISED POLYBENZIMIDAZOLE

(75) Inventors: Ulhas Kanhaiyalal Kharul, Maharashtra (IN); Santosh Chandrakant Kumbharkar, Maharashta (IN); Rupesh Sudhakar Bhavsar, Maharashta (IN)

(73) Assignee: Council of Scientific & Industrial Research, New Delhi (IN)

( * ) Notice: Subject to any disclaimer, the term of this patent is extended or adjusted under 35 U.S.C. 154(b) by 145 days.

(21) Appl. No.: 13/822,375

(22) PCT Filed: Sep. 14, 2011

(86) PCT No.: PCT/IN2011/000628
§ 371 (c)(1),
(2), (4) Date: Mar. 12, 2013

(87) PCT Pub. No.: WO2012/035556
PCT Pub. Date: Mar. 22, 2012

(65) Prior Publication Data
US 2013/0184412 A1 Jul. 18, 2013

(30) Foreign Application Priority Data
Sep. 14, 2010 (IN) .......................... 2171/DEL/2010

(51) Int. Cl.
*C08G 73/18* (2006.01)

(52) U.S. Cl.
CPC ............. *C08G 73/18* (2013.01); *C08J 2379/06* (2013.01)

(58) Field of Classification Search
CPC ............................ C08G 73/18; C08J 2379/06
See application file for complete search history.

(56) References Cited

U.S. PATENT DOCUMENTS

2005/0272880 A1* 12/2005 Klaehn et al. ................. 525/420

OTHER PUBLICATIONS

Asensio et al Recent Developments on Proton Conducting Poly(2,5-benzimidazole) (ABPBI) Membranes for High Temperature Polymer Electrolyte Membrane Fuel Cells, Journal of Membrane Science, Elsevier Scientific Publication Company, Amsterdam, NL, vol. 241, No. 1, Sep. 15, 2004, pp. 89-93.*
USPTO structure search, Oct. 2014.*
Kumbharkar et al (New N-substituted ABPBI: Synthesis and evaluation of gas permeation properties, Journal of Membrane Science, vol. 360, Issues 1-2, Sep. 15, 2010, pp. 418-425).*

* cited by examiner

*Primary Examiner* — Gregory Listvoyb
(74) *Attorney, Agent, or Firm* — Abelman, Frayne & Schwab (57) ABSTRACT

The invention discloses polymeric forms of ionic liquids, PFILs, based on polybenzimidazole (PBI) and a process for the synthesis of such polymeric forms of ionic liquids. The invention also relates to use of PBI based polymeric forms of ionic liquids and their membranes for gas sorption, permeation and separation.

7 Claims, 5 Drawing Sheets

1) ─┼─ PBI-I;
2) ─■─ [TMPBI-I][I];
3) ─●─ [TMPBI-I][BF$_4$];
4) ─▲─ [TMPBI-I][Tf$_2$N];
5) ─○─ PBI-BuI;
6) ─⊞─ [TMPBI-BuI][I];
7) ─◆─ [TMPBI-BuI][Ac];
8) ─★─ [TMPBI-BuI][TFAc];
9) ─▨─ [TMPBI-BuI][HFB];
10) ─▲─ [TMPBI-BuI][MS];
11) ─⬟─ [TMPBI-BuI][TFMS];
12) ─⬥─ [TMPBI-BuI][PTS];
13) ─✶─ [TMPBI-BuI][Bz];
14) ─□─ [TMPBI-BuI][NO$_3$];
15) ─△─ [TMPBI-BuI]BF$_4$];
16) ─⬠─ [TMPBI-BuI][Tf$_2$N];
17) ─⊕─ ABPBI;
18) ─☆─ [TMABPBI][I];
19) ─✲─ [TMABPBI][BF$_4$].

QUATERNISED POLYBENZIMIDAZOLE

CROSS-REFERENCE TO RELATED APPLICATIONS

This application is a National Phase of PCT/IN2011/000628, filed 14 Sep. 2011, which claims priority from IN No. 2171/DEL/2010, filed 14 Sep. 2010, the disclosures of which are incorporated herein by reference.

FIELD OF THE INVENTION

The present invention relates to polymeric forms of ionic liquids, PFILs, based on polybenzimidazole (PBI).

More particularly, the present invention further relates to a process for the synthesis of such polymeric forms of ionic liquids useful for gas sorption and permeation and separation.

BACKGROUND AND PRIOR ART OF THE INVENTION

Polymeric materials exhibiting high $CO_2$ sorption are attractive materials for their applicability as sorbent and gas separation membrane materials. Polybenzimidazole (PBI) based polymeric forms of ionic liquids (PFILs) have (i) excellent $CO_2$ sorption characteristics (ii) improved solvent solubility than parent PBIs (needed for membrane preparation either in flat sheet form or hollow fiber form) and (iii) high enough thermal stability. PBI based polymeric forms of ionic liquids (PFILs) are not known in the literature. These materials since are derived from thermally stable PBIs and thus have high thermal stability than their PIL counterparts derived from vinyl monomers known in the prior art, which are aliphatic in nature.

US2002/0189444 claims a liquid ionic compound of formula given below for separation of $CO_2$ from natural gas.

WO2006/026064 describes a polymer comprising a polymerized ionic liquid monomer selected from (a) imidazolium-based ionic liquids, consisting of 1-[2-(methacryloyloxy)ethyl]-3-butylimidazolium tetrafluoroborate ([MABI][BF$_4$]), 1-(p-vinylbenzyl)-3-butylimidazolium tetrafluoroborate ([VBBI][BF$_4$]), (b) ammonium-based ionic liquids, consisting of (p-vinylbenzyl)trimethyl ammonium tetrafluoroborate ([VBTMA][BF$_4$]), (p-vinylbenzyl)triethyl ammonium tetrafluoroborate ([VBTEA][BF$_4$]), (p-vinylbenzyl)tributyl ammonium tetrafluoroborate ([VBTBA][BF$_4$]), and (p-vinylbenzyl)trimethyl ammonium trifluoromethane sulfonamide ([VBTMA][Tf$_2$N]), condensation polymerization ionic monomers consisting of bis(2-hydroxyethyl)dimethyl ammouium tetrafluoroborate ([BHEDMA][BF$_4$]), 2,2-bis(methylimidazolium methyl)-1,3-propanediol tetrafluoroborate ([BMIMP][BF$_4$]), and 2,2-bis(butylimidazolium methyl)-1,3-propanediol tetrafluoroborate ([BBIMP][BF$_4$]) for absorption of $CO_2$ gas.

U.S. Pat. No. 4,898,917 discloses a unique process for the preparation of N-substituted polybenzimidazole polymers from unsubstituted polybenzimidazole polymers. According to the process of the invention unsubstituted polybenzimidazole polymer is first reacted with an alkali hydride to produce a polybenzimidazole anion in DMSO which is then reacted with a substituted or an unsubstituted alkyl, aryl or alkenyl methyl halide at a temperature of about 50-120° C. for 5-48 hours to produce an N-substituted alkyl, alkenyl or aryl polybenzimidazole polymer. The substituted polybenzimidazole polymer produced by this process can be formed into membranes, films, resins or fibers. The polymers can be used in reverse osmosis, ultrafiltration, microfiltration, electrodialysis, ion exchange and affinity chromatography. It is further described that the composition of the R substituent depends upon the desired N-substituted polybenzimidazole end product.

An article titled "Advances in $CO_2$ capture technology—The U.S. Department of Energy's Carbon Sequestration Program" by José D. Figueroa in INTERNATIONAL JOURNAL OF GREENHOUSE GAS CONTROL 2 (2008) 9-20, discusses the use of ionic liquid [hmim][Tf$_2$N] for dissolution of $CO_2$. The ionic liquid is shown to have good thermal stability allowing the recovery of $CO_2$ without requiring it to cool. The article discusses the development in the use of PBI membranes in $H_2/CO_2$ selectivity. The article further mentions a supported liquid membrane that is $CO_2$ selective and stable at temperatures exceeding 300° C. The membrane consists of an advanced polymer substrate and an ionic liquid. It is observed that in these supported liquid membranes transport takes place through the liquid within the pores rather than through a solid phase. This feature allows the membranes to take advantage of higher liquid phase diffusivities while maintaining the selectivity of the solution diffusion mechanism.

US2006/0021502 discloses cross-linked, supported polybenzimidazole membrane prepared by reacting polybenzimidazole (PBI) with the sulfone-containing crosslinking agent 3,4-dichloro-tetrahydro-thiophene-1,1-dioxide. The cross-linked polymer exhibits enhanced gas permeability to hydrogen, carbon dioxide, nitrogen, and methane as compared to the unmodified analog, without significant loss of selectivity, at temperatures from about 20 degrees Celsius to about 400 degrees Celsius. The cross linking agent has the general formula, wherein $R^1$ and $R^2$ are independently selected from alkyl having from 1 to 20 carbons, aryl having from 6 to 18 carbons, substituted aryl; wherein $R^1$ and $R^2$ are connected to form a ring structure having from 2 in 5 carbons; and wherein X and Z are independently selected from chloride, bromide, and iodide The cross linked polymer is given below, When ionic liquids (ILs) are impregnated in the porous membranes, all the pores of the porous support should be filled by IL. Moreover, only IL fraction is useful for the effective separation of gases.

In supported ionic liquid membranes (SILMs), liquid is held in the pores of the support via relatively weak capillary forces. When the transmembrane pressure differential is greater than those forces, the liquid will be pushed through the support, destroying the membrane. As a result, the SILMs mentioned above were only tested at pressure differentials of _0.2 atm (Ref: *J. Membr. Sci.* 2004, 238, 57; *Ind. Eng. Chem. Res.* 2007, 46, 5397-5404). Further, Poly (RTIL) films are reported to be brittle to make mechanically stable membranes.

Vinyl polymers suffer from more drawbacks such as: Vinyl containing monomers have limitations on structural architecture, they are porous and such porous polymers carry the threat of draining of liquid through the pores. As exemplified in the literature, present PFILs based on vinyl monomers are brittle and need to be crosslinked to form the film for membrane based separations.

Copolymers incorporating imidazole moiety such as polyether benzimidazoles, poly(arylene ether benzimidazole)s, poly(imide amide benzimidazole), poly(aryl ether benzimidazoles) and hyper branched polybenzimidazoles are known in literature. However, no prior arts have explored PFIL containing ionic liquid component incorporated in the imidazole polymer backbone itself, unlike vinyl polymers, which contain ionic liquid imidazole component in the side chain.

Therefore, there exists a need for polymeric forms of ionic liquids, where, the ionic liquids can be incorporated in the polymeric back bone itself to enhance the
structural strength of the polymer thereby enabling the polymer to withstand to any differential pressure and thus with enhanced performance.

Therefore, the present invention aims at fulfilling the existing need for polymeric forms of imidazoles or benzimidazoles where the ionic liquid moiety is present in the backbone of the polymer chain and exhibit a high degree of sorption for gases like $CO_2$ at differential pressure. There also exists a need to provide a process of making PFIL that allows structural modification, which also the present invention aims to fulfill in the current invention.

Another unfulfilled need in the literature is the ability of the PFILs to possess film forming characteristics without further modification or processing such as crosslinking. None of the PFILs reported in the literature have film forming characteristics. The present invention provides PFILs with film forming characteristics that can be used to adopt the PFILs in desirable forms such as films, sheets, granules, flakes, powders and such like.

There is also a need in the art to provide a stable polymeric form of ionic liquid that possesses a high degree of gas sorption, permeation and separation capacity.

OBJECTIVE OF THE INVENTION

Thus the objective of the invention is to provide a PBI based polymeric forms of ionic liquids with high degree of stability and high sorption capacity for gases like $CO_2$ and with an ability to form films, sheets, granules, flakes, powders and such like.

The object of the invention is also to provide a novel process for preparation of PBI based polymeric forms of ionic liquids.

SUMMARY OF THE INVENTION

The present invention relates to Polybenzimidazole (PBI) based polymeric forms of ionic liquids of formula III and IV

IV

V(c)

Wherein A, B are repeat units and the molar fraction of A is from 0-99% and that of B is 1 to 100%;

$R_1$ and $R_2$ is same or different and are each selected from the group consisting of $C_1$-$C_{20}$ alkyl, trialkyl silyl, cyclo alkyl, aryl, arylene, alkylene, or heterocyclic ring such as pyridine, pyrazine, furan, quinoline or thiophene groups as straight chain, branched, cyclic, aromatic, and derivatives thereof substituted with functional groups such as halo, nitro, ether, aldehyde, ketone, hydroxyl, carboxylic, sulfonic or ester;

$X'''$ is selected from $(C_nH_{2n+1})COO$, haloacetate, $(C_nF_{2n+1})COO$, ArCOO, where Ar may be substituted or unsubstituted, $(C_nH_{2n+1})SO_3$, $(C_nF_{2n+1})SO_3$, ArSO$_3$, where Ar may be substituted or unsubstituted aromatic moiety, $NO_3$, $NO_2$, $PO_3$, $BF_4$, $HPO_4$—$N(SO_2CF_3)_2$, $H_2PO_4$, $HSO_4$, $S_2O_3$, ClO, BrO$_3$, CrO$_4$, HCO$_3$, $C_2O_4$, MnO$_4$, NH$_2$, FeCl$_4^-$, PF$_6^-$, (CN)N$^-$, $C_{16}H_{34}PO_4^-$, $C_{12}H_{25}C_6H_4O_3^-$, SCN$^-$, CH$_2$=CHCOOCH$_2$CH$_2$CH$_2$SO$_3^-$, CH$_2$=CHSO$_3^-$, $C_6H_4CO_3SN^-$, o-tosylate, pyrazolium anion, imadaolium anion, triazole anion, tetrazole anion, oxazole anion, indolium anion, benztriazole anion, phenoxide anion, $N(SO_2(C_nF_{2n+1}))_2$ bis((perfluoroethyl)sulfonyl)imide (BETI$^-$), diethylenglykolmonomethylethersulphate (MDEGSO$_4^-$), alkylylsulfate $(C_nH_{2n+1})SO_4^-$, fluoroalkylylsulfate $(C_nF_{2n+1})SO_4^-$ tetracyanoborate $(B(CN)_4^-)$, tetrafluorosuccinate, hexafluoroglutarate, oxalate, malonate, glycolate, L-tartrate, maleate, mucobromate, nitrilotriacetate, 5-aminotetrazolate, DL-tartrate, lactate, gluconate, -malate, or mixture thereof.

wherein, R is a tetraamine monomer having structure formula V(a)-V(f)

V(a)

wherein, in structure formula V(a)-$R_1$, $R_2$=H, CH$_3$, CF$_3$, F, Cl, Br, I, NO$_2$ or $C_{1-24}$ containing alkyl or aryl groups, V(b)

wherein, in structure formula V(b)-$R_1$, $R_2$, $R_3$, $R_4$=H, CH$_3$, CF$_3$, F, Cl, Br, I, NO$_2$ or $C_{1-24}$ alkyl or aryl groups, wherein, in structure formula V(c)-$R_1$, $R_2$, $R_3$, $R_4$=H, CH$_3$, CF$_3$, F, Cl, Br, I, NO$_2$ or $C_{1-24}$ alkyl or aryl groups,

V(d)

wherein, in structure formula V(d)-$R_1$, $R_2$, $R_3$, $R_4$=H, CH$_3$, CF$_3$, F, Cl, Br, I, NO$_2$ or $C_{1-24}$ alkyl or aryl groups, V(e)

wherein structure formula V(e)-; $R_1$, $R_2$, $R_3$, $R_4$=H, CH$_3$, CF$_3$, F, Cl, Br, I, NO$_2$ or $C_{1-24}$ alkyl or aryl groups and X is selected from the group consisting of: —CH$_2$—, —O—, —SO$_2$—, —C(CH$_3$)$_2$—, —C(CF$_3$)$_2$—, —C(Ph)$_2$-, —CH$_3$C(Ph)-, —CH$_3$C(isopropyl)-, —CH$_3$C(t-butyl)-, —CH$_3$C(n-propyl)-, —CH$_3$C(ethyl)- or any other $C_{1-24}$ containing alkyl or aryl groups, V(f)

and R' of Formula III and IV is dicarboxylic acid as shown in structure VI:

HOOC—$(C_kH_mX_n)$—COOH   VI wherein k=1-30 containing alkyl, aryl, aromatic, arylene, alkylene, arylene-ether or heterocyclic ring such as pyridine, pyrazine, furan, quinoline or thiophene groups as straight chain, branched, cyclic, aromatic or combination of these; X=H, O, N, S, halogen or combination thereof, n=0-10 and m=appropriate numbers of hydrogens.

In an embodiment of the present invention is disclosed Polybenzimidazole (PBI) based polymeric forms of ionic liquids having high stability, solubility coefficient, selectivity, permeability coefficient, permselectivity and high sorption capacity for gases selected from the group consisting of hydrogen, nitrogen, carbon dioxide, methane, helium, $H_2S$ and water vapor.

In another embodiment of the present invention is disclosed polybenzimidazole (PBI) based polymeric forms of ionic liquids wherein the polymeric forms of ionic liquids have an ability to form films, sheets, granules, flakes, powders.

In yet another embodiment of the present invention is disclosed polybenzimidazole (PBI) based polymeric forms of ionic liquids for use in used as separating media such as membrane, sorbent, extraction, chromatography as polymer electrolytes in devices such as fuel cell, batteries, supercapacitor, solar cell, as dispersing agents, nanomaterials, microwave absorbing materials for use in electrowetting, water breathable fabrics The present invention also relates to a process for preparation of polybenzimidazole (PBI) based polymeric forms of ionic liquids comprising:
a. reacting PBI of formula I or II with metal hydride to obtain corresponding metal salt of formula I and II;
b) treating the metal salt of PBI with reagent $R_1X'$ or $R_2X''$ wherein $R_1$ and $R_2$ is same or different and are each selected from the group consisting of $C_1$-$C_{20}$ alkyl, trialkyl silyl, cyclo alkyl, aryl, arylene, alkylene, or heterocyclic ring such as pyridine, pyrazine, furan, quinoline or thiophene groups as straight chain, branched, cyclic, aromatic, and derivatives thereof substituted with functional groups such as halo, nitro, ether, aldehyde, ketone, hydroxyl, carboxylic, sulfonic or ester,
$X'$ and $X''$ are selected from the group consisting of I, Cl, Br, F, $NO_2$ to obtain N-quaternized PBI.
c) anion exchange of N-quaternized PBI by treating with metal salts to obtain polymeric forms of ionic liquids of formula III and IV.

In an embodiment of the present invention is disclosed that the degree of N-quarternization is in the range of 1% to 100%.

In another embodiment of the present invention is disclosed, metal salts used in the process for preparation of polybenzimidazole (PBI) based polymeric forms of ionic liquids are selected from Silver tetrafluoroborate, Lithium bis(trifluoromethane)sulfonamide, Silver acetate, silver bromoacetate, Silver tirfluoroacetate, Silver heptafluoro butyrate, Silver Methane sulphonate, Silver trifluoromethane sulphonate, Silver p-toluene sulphonate, Silver Benzoate, Silver Nitrate, Silver tetrafluoroborate, silver amide, and Lithium bis(trifluoromethane)sulfonamide, lithium nitrate, lithium nitrite, lithium bromide. Lithium sulphate, lithium sulfite, lithium amide, lithium chlorite, lithium hypochlorite, lithium oxalate, lithium formate monohydrate, $FeCl_{4-}$, $PF_{6-}$, $(CN)_{2N}^-$, $C_{16H34P}O_{4-}$, $C_{12H25C6H4O3-}$, $SCN^-$, $CH_2\!=\!CHCOOCH_2CH_2CH_2SO_3-$, $CH_2\!=\!CHSO_{3-}$, $C_{6H4C}O_{3S}N^-$, o-tosylate, Pyrazolium anion, Imadaolium anion, Triazole anion, Tetrazole anion, Oxazole anion, Indolium anion, Benztriazole anion, Phenoxide anion, $N(SO_2(C_{nF2n+1})_{2b}$ is((perfluoroethyl)sulfonyl)imide (BETI$^-$), Diethylenglykolmonomethylethersulphate (MDEGSO$_{4-}$), alkylylsulfate $(C_{nH2n+1})SO_4-$, fluoroalkylylsulfate $(C_{nF2n+1})SO_4-$ Tetracyanoborate (B(CN)$_{4-}$), Tetrafluorosuccinate, Hexafluoroglutarate, Oxalate, Malonate, Glycolate, L-Tartrate, Maleate, Mucobromate, Nitrilotriacetate, 5-Aminotetrazolate, DL-Tartrate, Lactate, Gluconate, DL-Malate, or mixture thereof.

In further embodiment of the present invention is disclosed the polybenzimidazole based stable polymeric forms of ionic liquids for sorption, permeation and separation of gases which can be made into films, sheets, flakes and such like.

DETAILED DESCRIPTION OF INVENTION

In accordance with the objectives of the invention, the PBIs of the invention that are used to synthesize the polymeric forms of ionic liquids are of formula I or II as given below:

I

II wherein, R is tetraamine monomer having structure V(a)-V(f)

V(a)

wherein, $R_1$, $R_2$=H, $CH_3$, $CF_3$, F, Cl, Br, I, $NO_2$ or $C_{1-24}$ containing alkyl or aryl groups.

V(b)

wherein, $R_1$, $R_2$, $R_3$, $R_4$=H, $CH_3$, $CF_3$, F, Cl, Br, I, $NO_2$ or $C_{1-24}$ alkyl or aryl groups.

V(c)

wherein, $R_1$, $R_2$, $R_3$, $R_4$=H, $CH_3$, $CF_3$, F, Cl, Br, I, $NO_2$ or $C_{1-24}$ alkyl or aryl groups.

V(d)

wherein, $R_1$, $R_2$, $R_3$, $R_4$=H, $CH_3$, $CF_3$, F, Cl, Br, I, $NO_2$ or $C_{1-24}$ alkyl or aryl groups.

V(e)

wherein, $R_1$, $R_2$, $R_3$, $R_4$=H, $CH_3$, $CF_3$, F, Cl, Br, I, $NO_2$ or $C_{1-24}$ alkyl or aryl groups and X can be disubstituted group of the following: —$CH_2$—, —O—, —$SO_2$—, —$C(CH_3)_2$—, —$C(CF_3)_2$—, —$C(Ph)_2$-, —$CH_3C(Ph)$-, —$CH_3C$(isopropyl)-, —$CH_3C$(t-butyl)-, —$CH_3C$(n-propyl)-, —$CH_3C$(ethyl)- or any other $C_{1-24}$ containing alkyl or aryl groups.

V(f)

and R' is from dicarboxylic acid as shown in structure VI:

HOOC—$(C_kH_mX_n)$—COOH     VI where k=1-30 containing alkyl, aryl, aromatic, arylene, alkylene, arylene-ether or heterocyclic ring such as pyridine, pyrazine, furan, quinoline or thiophene groups as straight chain, branched, cyclic, aromatic or combination of these; X=O, N, S, halogen or combination thereof, n=0-10 and m=appropriate numbers of hydrogens.

Accordingly, in preferred embodiment, the invention discloses polybenzimidazole (PBI) based polymeric forms of ionic liquids of formula III and IV.

III

IV $R_1$ and $R_2$ is same or different and are each selected from the group consisting of $C_1$-$C_{20}$ alkyl, trialkyl silyl, cyclo alkyl, aryl, arylene, alkylene, or heterocyclic ring such as pyridine, pyrazine, furan, quinoline or thiophene groups as straight chain, branched, cyclic, aromatic, and derivatives thereof substituted with functional groups such as halo, nitro, ether, aldehyde, ketone, hydroxyl, carboxylic, sulfonic or ester;

X''' is selected from $(C_nH_{2n+1})$COO, haloacetate, $(C_nF_{2n+1})$COO, ArCOO, where Ar may be substituted or unsubstituted, $(C_nH_{2n+1})SO_3$, $(C_nF_{2n+1})SO_3$ $ArSO_3$, where Ar may be substituted or unsubstituted any aromatic moiety, $NO_3$, $NO_2$, $PO_3$, $BF_4$, $HPO_4$—$N(SO_2CF_3)_2$, $H_2PO_4$, $HSO_4$, $S_2O_3$, $ClO_4$, $BrO_3$, $CrO_4$, $HCO_3$, $C_2O_4$, $MnO_4$, $NH_2$, etc;

wherein, R is tetraamine monomer having structure V(a)-V(f)

V(a)

wherein, $R_1$, $R_2$=H, $CH_3$, $CF_3$, F, Cl, Br, I, $NO_2$ or $C_{1-24}$ containing alkyl or aryl groups, V(b)

wherein, $R_1$, $R_2$, $R_3$, $R_4$=H, $CH_3$, $CF_3$, F, Cl, Br, I, $NO_2$ or $C_{1-24}$ alkyl or aryl groups, V(c)

wherein, $R_1$, $R_2$, $R_3$, $R_4$=H, $CH_3$, $CF_3$, F, Cl, Br, I, $NO_2$ or $C_{1-24}$ alkyl or aryl groups, V(d)

wherein, $R_1$, $R_2$, $R_3$, $R_4$=H, $CH_3$, $CF_3$, F, Cl, Br, I, $NO_2$ or $C_{1-24}$ alkyl or aryl groups, V(e)

wherein, $R_1$, $R_2$, $R_3$, $R_4$=H, $CH_3$, $CF_3$, F, Cl, Br, I, $NO_2$ or $C_{1-24}$ alkyl or aryl groups and X can be any of the following: —$CH_2$—, —O—, —$SO_2$—, —$C(CH_3)_2$—, —$C(CF_3)_2$—, —$C(Ph)_2$-, —$CH_3C(Ph)$-, —$CH_3C(isopropyl)$-, —$CH_3C(t$-butyl)-, —$CH_3C(n$-propyl)-, —$CH_3C(ethyl)$- or any other $C_{1-24}$ containing alkyl or aryl groups, V(f)

and R' is from dicarboxylic acid as shown in structure VI:

VI where k=1-30 containing alkyl, aryl, aromatic, arylene, alkylene, arylene-ether or heterocyclic ring such as pyridine, pyrazine, furan, quinoline or thiophene groups as straight chain, branched, cyclic, aromatic or combination of these; X=O, N, S, halogen or combination thereof, n=0-10 and m=appropriate numbers of hydrogens.

The polybenzimidazoles (PBI) of structure I and II are transformed to PFILs III and IV by the process as given in Scheme I and II below:

Scheme 1: PFIL (III) based on I

Intermediate I

Intermediate II

PFIL

Scheme 2: PFIL (IV) base on II

Intermediate I

Intermediate II

PFIL wherein,

$R_1X'$ and $R_2X''$ can be same or different,

M=Metal capable of forming salt, exemplified as Ag, Li, Na and $R_1$, $R_2$, X', X", X'" are as given in Table 1, while the ratio A and B of repeat unit is given in Table 2.

Accordingly process for preparation of polybenzimidazole (PBI) based polymeric forms of ionic liquids comprising:

a) Reacting PBI of formula I or II with metal hydride to obtain corresponding metal salt of PBI;
b) treating the metal salt of PBI as obtained in step (a) with reagent $R_1X'$ or $R_2X''$ of Scheme 1 and 2 to obtain N-quaternized form of PBI of formula III and IV and
c) Anion exchange of N-quaternized form of PBI of step (b) by treating with metal salts to obtain polymeric forms of ionic liquids of formula III and IV.

The metal salts that can be used to achieve the desired polymeric forms of ionic liquids are selected from Silver tetrafluoroborate, Lithium bis(trifluoromethane)sulfonamide, Silver acetate, silver bromoacetate, Silver tirfluoroacetate, Silver heptafluoro butyrate, Silver Methane sulphonate, Silver trifluoromethane sulphonate, Silver p-toluene sulphonate, Silver Benzoate, Silver Nitrate, Silver tetrafluoroborate, silver amide, and Lithium bis(trifluoromethane)sulfonamide, lithium nitrate, lithium nitrite, lithium bromide. Lithium sulphate, lithium sulfite, lithium amide, lithium chlorite, lithium hypochlorite, lithium oxalate, lithium formate monohydrate.

TABLE 1

Possible combinations of $R_1$, $R_2$, X', X", X'" in Scheme 1 and 2

| $R_1$ and/or $R_2$ | X' and/or X" | X'" |
|---|---|---|
| $R_1$ and $R_2$ is same or different and are each selected from the group consisting of $C_1$-$C_{20}$ alkyl, trialkyl silyl, cyclo alkyl, aryl, arylene, alkylene, or heterocyclic ring such as pyridine, pyrazine, furan, quinoline | I, Cl, Br, F, $NO_2$ etc. | $(C_nH_{2n+1})COO$, haloacetate, formate, $(C_nF_{2n+1})COO$, ArCOO where Ar may be substituted or unsubstituted aromatic moiety, $(C_nH_{2n+1})SO_3$, $(C_nF_{2n+1})SO_3$ $ArSO_3$ where Ar may be substituted or unsubstituted aromatic moiety, $NO_3$, $NO_2$, $PO_3$, $BF_4$, $HPO_4^-$ $N(SO_2CF_3)_2$, $H_2PO_4$, $HSO_4$, $S_2O_3$, $ClO_4'$ $BrO_3'$, $CrO_4'$ $HCO_3'$ $C_2O_4'$ $MnO_4$ $NH_2'$ $FeCl_4^-$, |

TABLE 1-continued

Possible combinations of $R_1$, $R_2$, X', X", X'" in Scheme 1 and 2

| $R_1$ and/or $R_2$ | X' and/or X" | X'" |
|---|---|---|
| or thiophene groups as straight chain, branched, cyclic, aromatic, and derivatives thereof substituted with functional groups such as halo, nitro, ether, aldehyde, ketone, hydroxyl, carboxylic, sulfonic or ester | | $PF_6^-$, $(CN)_2N^-$, $C_{16}H_{34}PO_4^-$, $C_{12}H_{25}C_6H_4O_3^-$, $SCN^-$, $CH_2$=$CHCOOCH_2CH_2CH_2SO_3^-$, $CH_2$=$CHSO_3^-$, $C_6H_4CO_3SN^-$, o-tosylate, Pyrazolium anion, Imadaolium anion, Triazole anion, Tetrazole anion, Oxazole anion, Indolium anion, Benztriazole anion, Phenoxide anion, $N(SO_2(C_nF_{2n+1}))_2$ bis((perfluoroethyl)sulfonyl)imide ($BETI^-$), diethylenglykolmonomethylethersulphate ($MDEGSO_4^-$, alkylylsulfate $(C_nF_{2n+1})SO_4^-$, fluoroalkylylsulfate $(C_nF_{2n+1})SO_4^-$ Tetracyanoborate $(B(CN)_4^-)$, Tetrafluorosuccinate, Hexafluoroglutarate, Oxalate, Malonate, Glycolate, L-Tartrate, Maleate, Mucobromate, Nitrilotriacetate, 5-Aminotetrazolate, DL-Tartrate, Lactate, Gluconate, DL-Malate. |

TABLE 2

Degree of quaternization with different molar concentration of RX ($R_1X'$ and $R_2X''$).

| Degree of quaternization | Molar equivalent of RX required | | Molar ratio | |
|---|---|---|---|---|
| | For formula I | For formula II | A | B |
| 100% | 4.0 | 2.0 | 0 | 1 |
| 75% | 3.5 | 1.75 | 1 | 3 |
| 50% | 3.0 | 1.5 | 1 | 1 |
| 25% | 2.5 | 1.25 | 3 | 1 |

Figure 2:
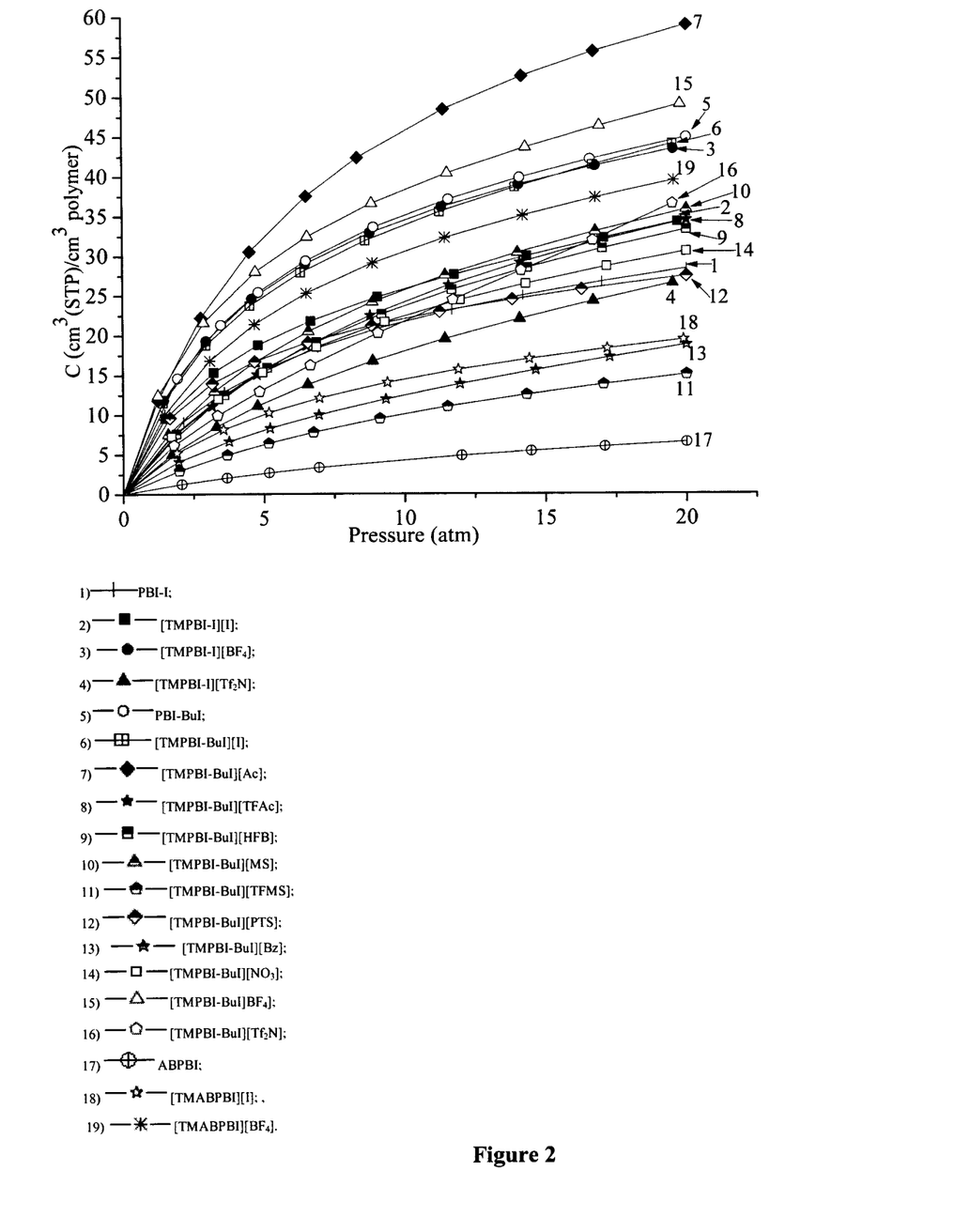
FIG. 2: $CO_2$ sorption isotherm of PFILs at 35° C.
Figure 3:
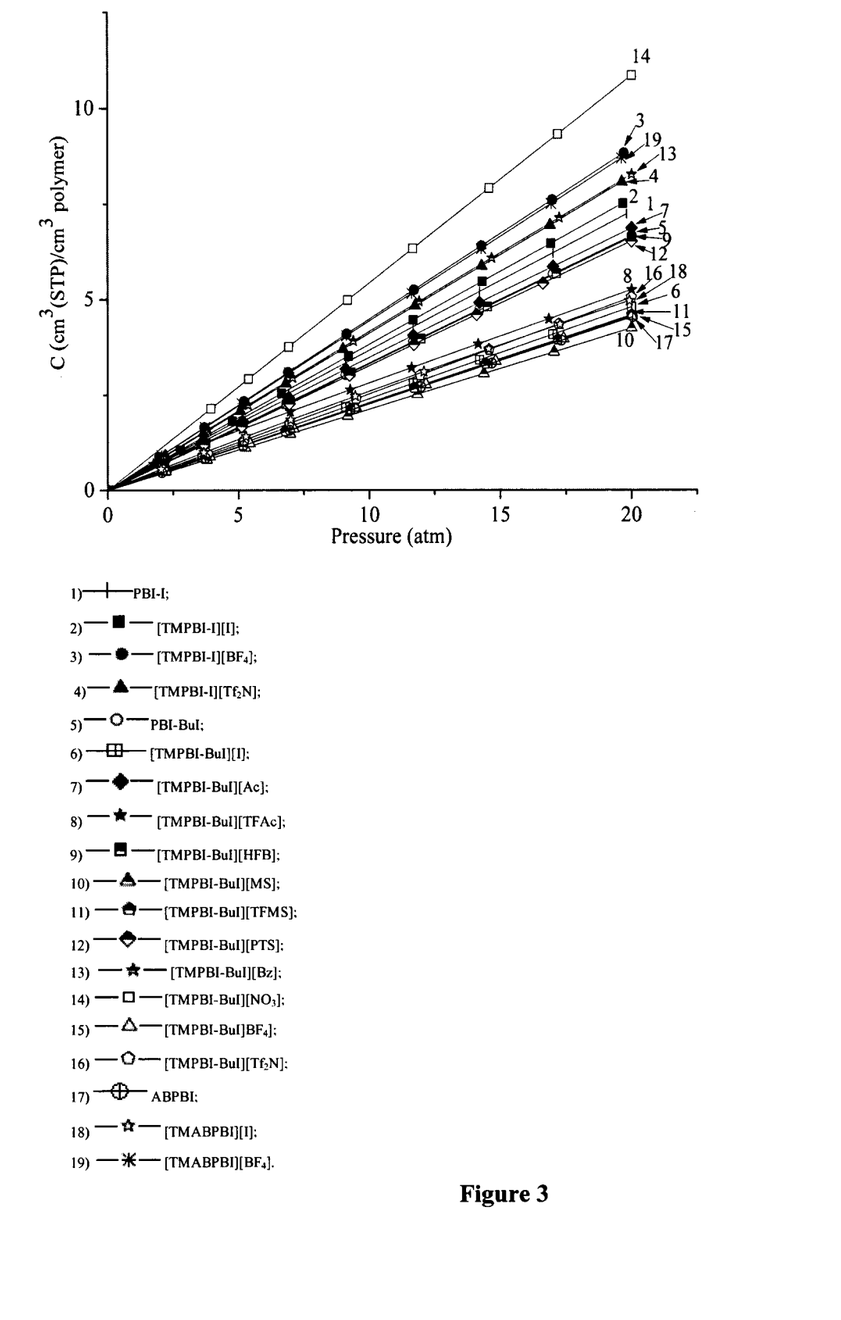
FIG. 3: $H_2$ sorption isotherm of PFILs at 35° C.
Figure 4:
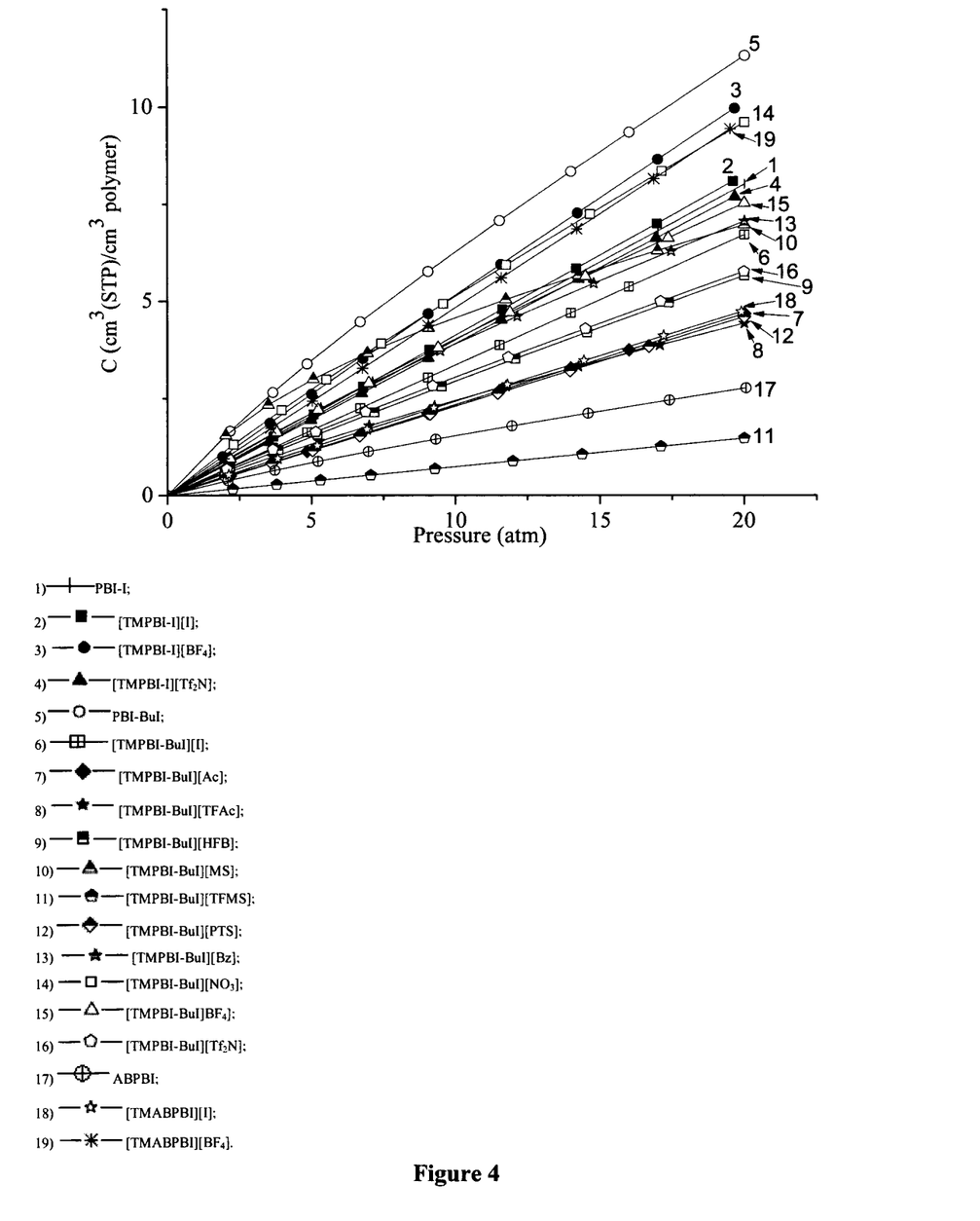
FIG. 4: $N_2$ sorption isotherm of PFILs at 35° C.
Figure 5:
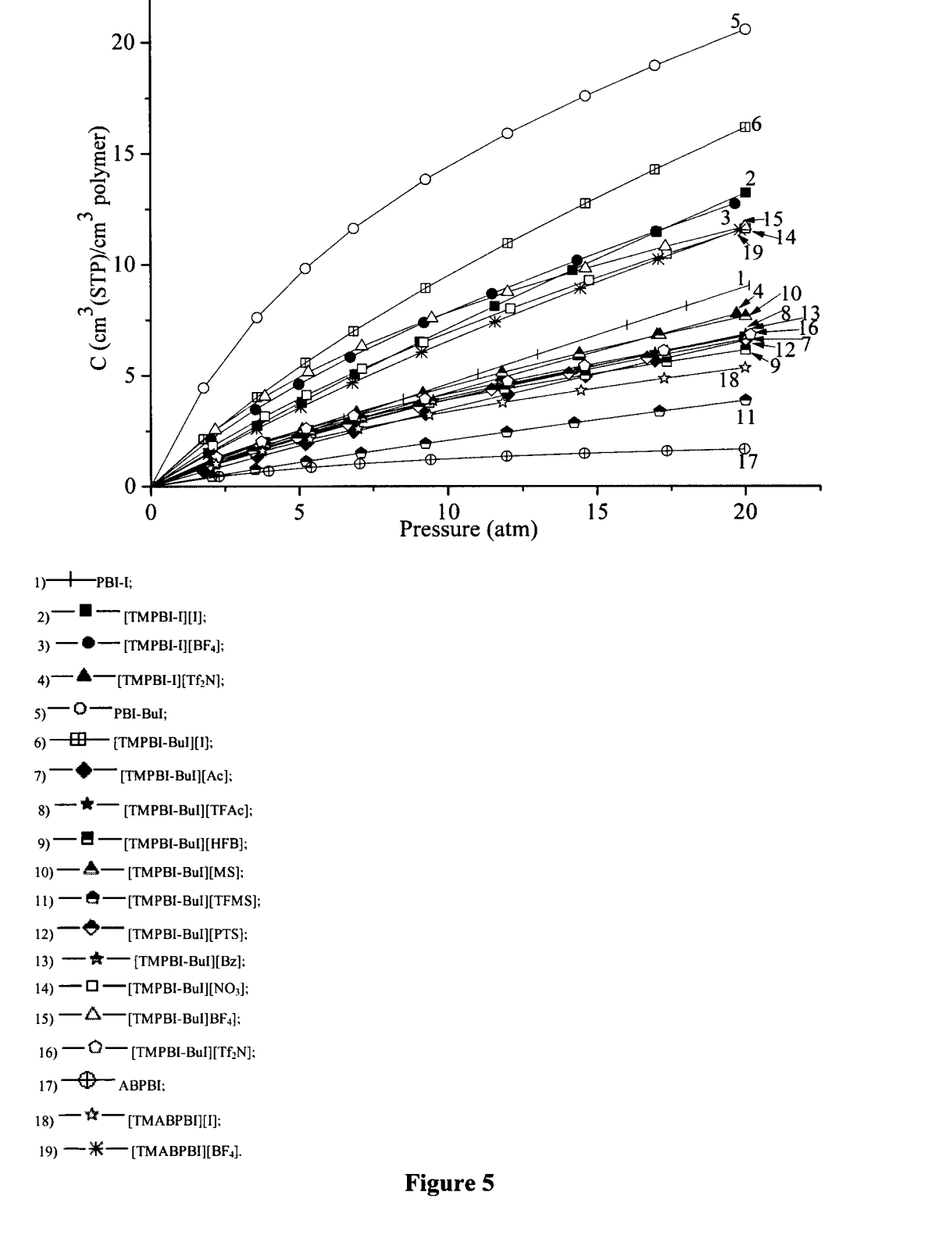
FIG. 5: $CH_4$ sorption isotherm of PFILs at 35° C.

The figures attached herein plot amount of gas (in ml) sorbed by a unit volume of the polymer matrix (also expressed in ml) at varying pressure and at constant temperature of 35° C. FIG. 2 plotting $CO_2$ sorption conveys that [TMPBI-BuI][Ac] has the highest $CO_2$ sorption among the series investigated, followed by [TMPBI-BuI][$BF_4$] and so on. Based on these isotherms, solubility coefficients are calculated as given in Example 8 and tabulated in Table 6.1-6.3. FIGS. 3, 4 and 5 plots sorption isotherms for $H_2$, $N_2$ and $CH_4$; respectively. It is obvious that higher sorption coefficient for $CO_2$ and lower ones for other gases would yield higher sorption selectivity and such polymers are better for either $CO_2$ sorption or its permeation (when we use PFIL as a membrane material), In an embodiment, polybenzimidazole (PBI) based polymeric forms of ionic liquids according to present invention wherein, the degree of N-quarternization is in the range of 1% to 100%.

In an embodiment of the invention, the PFILs have high glass transition temperature.

In another embodiment of the invention, PFILs are converted into tough films, indicating their stability towards high pressure for performing gas separation at elevated pressures. Since the PFILs of the invention possess high thermal stability also, the separation can also be done at elevated temperature.

Polymeric forms of PBIs as described and prepared herein are used for sorption of gases selected from, but not limited to $H_2$, $N_2$, $CO_2$, $CH_4$, $H_2S$, water vapor, etc. as exemplified herein. Such PFILs are useful in various applications including gas sorption in the form of films, sheets, granules, flakes, powders and such like.

PFILs of the invention can also have potential use as functional materials in the areas of polymer electrolytes, sorbents, dispersing agents, and nanomaterials, for use in solid phase extraction and chromatography, microwave absorbing materials and for use in electrowetting. PFILs are also used as water breathable membranes.

EXAMPLES

The following examples are given by way of illustration and therefore should not be construed to limit the scope of the present invention.

Example 1

Synthesis of poly(benzimidazole) (PBI)

A three-neck round bottom flask equipped with a mechanical stirrer, nitrogen inlet and an outlet was charged with 450 g of polyphosphoric acid and heated with stirring above 100° C. under constant flow of nitrogen. 15 g (0.07 mol) of 3,3'-diaminobenzidine and 11.63 g (0.07 mol) of isophthalic acid or 15.56 g (0.07 mol) of 5-tert-butylisophthalic acid was added to the reaction mixture. The temperature was slowly raised to 200° C. and maintained for 10-14 hr, depending on the dicarboxylic acid. The polymer was obtained by precipitating the formed solution into water. The precipitated polymer was washed with water, followed by aqueous sodium bicarbonate and water. The obtained polymer was dried at 80° C. under vacuum.

Example 2

Synthesis of poly(2,5-benzimidazole) (ABPBI)

The reaction mixture containing 5 g of 3,4-diaminobenzoic acid (DABA) in 100 g PPA was stirred at 170° C. for an hour and then at 200° C. for an additional hour. Formed polymer after precipitating in water was crushed and washed with water till to get neutral pH. It was then kept in 10% NaOH for 16 h, washed with water till to get neutral pH, soaked in acetone for 5 h and dried at 100° C. under vacuum for 3 days. ABPBI was used as such for further reactions of N-quaternization.

TABLE 3

Abbreviations of synthesized PBI

| Tetraamine used | Diacid used | Polymer abbreviation |
|---|---|---|
| 3,3'-Diaminobenzidine | Isophthalic acid | PBI—I |
| 3,3'-Diaminobenzidine | 5-tert-butylisophthalic acid | PBI—BuI |
| 3,4-Diaminobenzoic acid | | ABPBI |

Example 3

General Reaction Protocol for N-Quaternization of PBI-I and PBI-BuI

The reactions of N-quaternization of PBI-I and PBI-BuI are represented in Scheme I. Typically, a 3-necked round bottom flask was charged with 160 ml of dry DMSO, 0.0162 mol of respective PBI, 2.1 equivalents of NaH (0.03409 mol) and stirred under dry $N_2$ atmosphere at ambient upto 24 h. The reaction mixture was further heated at 80° C. for an hour, where a deep blood red colour developed after complete dissolution of PBI, indicating formation of the N-sodium salt of PBI. The reaction mixture was cooled to the ambient and required equivalents of alkyl halide (Table 2.) was added slowly over a period of 15 minutes. A yellow precipitate was formed, which dissolved as the temperature was elevated to 80° C. This temperature was maintained for 24 h. The reaction mixture after attaining ambient temperature was precipitated in a mixture of toluene and acetone (1:1). Obtained fibrous precipitate was dried at 80° C. for 24 h. It was further purified by dissolving in DMSO and reprecipitating in a suitable nonsolvent. Obtained precipitate was dried at 60° C. for 24 h and then in vacuum oven at 80° C. for 3 days. The abbreviations used for the formed products are given in Table 5.

Example 4

General Reaction Protocol for N-Quaternization of ABPBI

The reaction of N-quaternization of ABPBI was carried out as given in Scheme II. Typically, a 3-necked round bottom flask was charged with 160 ml of dry DMSO, 0.0162 mol of ABPBI, 1.1 equivalents of NaH (0.01782 mol) and stirred under dry $N_2$ atmosphere at 170° C. for 5 h; where a deep blood red colour developed after complete dissolution of ABPBI, indicating formation of the N-sodium salt of ABPBI. The reaction mixture was cooled to the ambient and 2.2 equivalents of alkyl halide (0.03402 mol) was added slowly over a period of 15 minutes. A precipitate was formed, which dissolved as the temperature was elevated to 80° C. This temperature was maintained for 24 h. The reaction mixture after attaining ambient temperature was precipitated in a mixture of toluene and acetone (1:1). Obtained fibrous precipitate was dried at 80° C. for 24 h. It was further purified by dissolving in DMSO and reprecipitating in toluene:acetone mixture. Obtained precipitate was dried at 60° C. for 24 h and then in vacuum oven at 80° C. for 3 days.

The abbreviation used for the formed product is given in Table 5.

Figure 1:
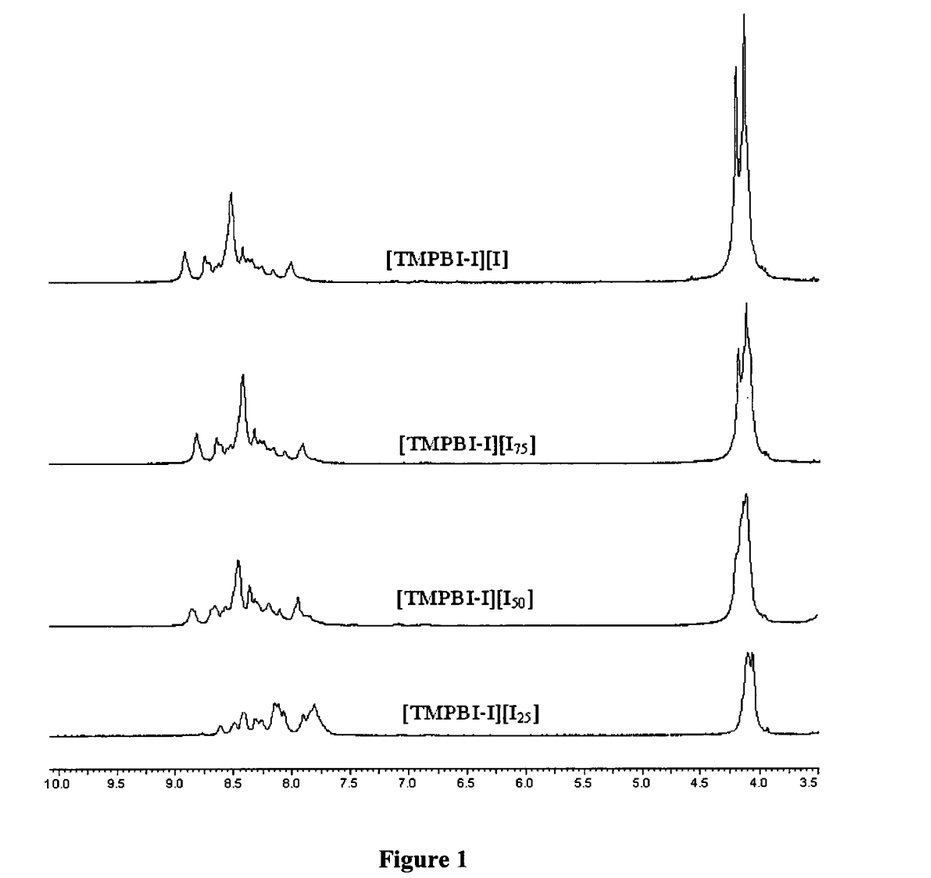
FIG. 1: $^1$H NMR of quaternized PBI possessing different degree of substitution.

Degree of quaternization was estimated using $^1$H-NMR spectra. Integration of the protons of methyl group appearing in the range δ4.0-4.5 was compared with the integration of aromatic protons to quantify degree of substitution (Ref: US 2009/0012253 A1, *European Polym. J.* 2009, 45, 3363-3371). As an example, $^1$H-NMR of some of the PFILs containing iodide as the counter ion are shown in FIG. 1. Obtained values of % quaternization are given in Table 4.

TABLE 4

Abbreviations used for quaternized PBI (Scheme I and II) and their degree of quaternization obtained by $^1$H-NMR

| Polymer Abbreviation | Percent degree of quaternization (planned) | Observed degree of quaternization (by $^1$H-NMR) |
|---|---|---|
| [TMPBI—I][I$_{25}$] | 25 | 24.5 |
| [TMPBI—I][I$_{50}$] | 50 | 49.0 |
| [TMPBI—I][I$_{75}$] | 75 | 75.2 |
| [TMPBI—I][I] | 100 | 96.5 |
| [TMPBI—BuI][I$_{25}$] | 25 | 26.6 |
| [TMPBI—BuI][I$_{50}$] | 50 | 55.6 |
| [TMPBI—BuI][I$_{75}$] | 75 | 71.3 |
| [TMPBI—BuI][I] | 100 | 91.0 |
| [DMABPBI][I] | 100 | 92.0 |

Example 5

Synthesis of PFILs by Anion Exchange of N-Quaternized PBIs Using Anion X''' as Exemplified in Table 1 (Except for N(SO₂CF₃)₂)

An exchange of iodide anion of a quaternized PBI by AgX''' was performed by dissolving it in a suitable solvent (DMSO, DMAc or DMF). Typically, a two necked round bottom flask equipped with a calcium chloride guard tube was charged with 50 ml of a desired solvent and 0.008 mol of quaternized PBI (PFIL with iodide as the counterion). After complete dissolution of polymer while stirring, required moles of Ag X''' was added. The formation of a fine precipitate of AgI began with the addition of AgX'''. The reaction mixture was further stirred at ambient temperature for 24 h to ensure complete replacement of the anion. The reaction mixture was centrifuged at 3000 rpm for 5 h to separate the fine precipitate of AgI. The supernatant polymer solution after centrifugation was evaporated to recover the polymer, which was further purified by dissolving in DMF (10% w/w), precipitating in low boiling solvent and drying at 60° C. in vacuum oven for 3 days.

Example 6

Synthesis of PFILs by Anion Exchange of N-Quaternized PBIs Using the Anion bis(trifluoromethane)sulfonimide (N(SO₂CF₃)₂, Abbreviated as Tf₂N.⁻

For the exchange of iodide (I⁻) by bis(trifluoromethane) sulfonimide (Tf₂N.⁻), 0.008 mol of PFIL with iodide as the counterion was dissolved in a desired solvent (DMSO for [TMPBI-I][I] and DMAc for [TMPBI-BuI][I]) and 0.016 mol of Li—Tf₂N was added. A solution was further stirred for 24 h. The byproduct, LiI was removed by precipitating the reaction mixture in deionized (DI) water at ambient temperature. The precipitate was further washed with water several times to remove LiI. All the precipitated polymers with Tf₂N.⁻ as the counterion were purified by dissolving in DMAc (10% w/w), reprecipitating in water, followed by drying at 60° C. in vacuum oven for 48 h. Structures of these polymers obtained are given in Schemes I and II and abbreviations used are given in Table 5 below.

TABLE 5

PFILs synthesized and their abbreviations used

| Quaternized PBI | Metal salt used (Ag X''' or Li X''') | PFIL abbreviations |
|---|---|---|
| PFILs based on PBI—I | | |
| [TMPBI—I][I] | Silver tetrafluoroborate | [TMPBI—I][BF₄] |
| [TMPBI—I][I] | Lithium bis(trifluoromethane) sulfonimide | [TMPBI—I][Tf₂N] |
| [TMPBI—I][I₂₅] | Silver trifluromethane sulphonate | [TMPBI—I][TFMS₂₅] |
| [TMPBI—I][I₅₀] | Silver trifluromethane sulphonate | [TMPBI—I][TFMS₅₀] |
| [TMPBI—I][I₇₅] | Silver trifluromethane sulphonate | [TMPBI—I][TFMS₇₅] |
| [TMPBI—I][I] | Silver trifluromethane sulphonate | [TMPBI—I][TFMS] |
| PFILs based on PBI—BuI | | |
| [TMPBI—BuI][I] | Silver acetate | [TMPBI—BuI][Ac] |
| [TMPBI—BuI][I] | Silver tirfluroacetate | [TMPBI—BuI][TFAc] |
| [TMPBI—BuI][I] | Silver heptafluro butyrate | [TMPBI—BuI][HFB] |
| [TMPBI—BuI][I] | Silver Methane sulphonate | [TMPBI—BuI][MS] |
| [TMPBI—BuI][I₂₅] | Silver trifluromethane sulphonate | [TMPBI—BuI][TFMS₂₅] |
| [TMPBI—BuI][I₅₀] | Silver trifluromethane sulphonate | [TMPBI—BuI][TFMS₅₀] |
| [TMPBI—BuI][I₇₅] | Silver trifluromethane sulphonate | [TMPBI—BuI][TFMS₇₅] |
| [TMPBI—BuI][I] | Silver trifluromethane sulphonate | [TMPBI—BuI][TFMS] |
| [TMPBI—BuI][I] | Silver p-toluene sulphonate | [TMPBI—BuI][PTS] |
| [TMPBI—BuI][I] | Silver Benzoate | [TMPBI—BuI][Bz] |
| [TMPBI—BuI][I] | Silver Nitrate | [TMPBI—BuI][NO₃] |
| [TMPBI—BuI][I] | Silver tetrafluoroborate | [TMPBI—BuI][BF₄] |
| [TMPBI—BuI][I] | Lithium bis(trifluoromethane) sulfonimide | [TMPBI—BuI][Tf₂N] |
| PFILs based on ABPBI | | |
| [DMABPBI][I] | Silver tetrafluoroborate | [DMABPBI][BF₄] |

Example 7

Dense Membrane Preparation

Dense membranes of precursor PBI and PFILs were prepared by solution casting method using 3% (w/v) polymer solution in appropriate solvent; prepared while stirring at 80° C. for 14-18 h under dry atmosphere. Formed membrane (~40 μm thick) was peeled off. PBI membranes were soaked in water at 60° C. for 3 days in order to extract the traces of solvent and then dried in vacuum oven at 100° C. for a week. PFILs membranes after the casting were kept in vacuum oven for 10 days.

Example 8

Gas Sorption Analysis of Present PFILs

The equilibrium gas sorption isotherms for $H_2$, $N_2$, $CH_4$ and $CO_2$ in present polymers was carried out at incremental pressures up to 20 atm and at 35° C. using the gas sorption equipment that consisted of dual-volume single-transducer set up based on the pressure decay method. The obtained gas sorption isotherms for above gases are shown in FIG. 2-5. [TMPBI-BuI][Ac] showed highest $CO_2$ sorption in the series while maintaining high $CO_2/N_2$ and $CO_2/CH_4$ sorption selectivity. Also [TMPBI.BuI][PTS] and [TMPBI.BuI][BF₄] shows good $CO_2/N_2$ and $CO_2/H_2$ sorption selectivity respectively.

The gas solubility coefficient (S) is expressed as $$S = \frac{C}{p}$$

where C is the gas concentration in polymer, p the applied gas pressure. The Solubility coefficient (S) and solubility selectivity ($S_A/S_B$) is given in Table 6.1-6.3

Example 9

Permeation Analysis of these PFILs

Dense membranes as exemplified in Example 7 with 4.5 cm diameter and ~35±5 μm thickness were used for determining pure gas permeability of He, $H_2$, $N_2$, $CH_4$ and $CO_2$ by the variable volume method at 35° C. and upstream pressure of 20 atm. Gas permeability was calculated using following equation.

$$P = \frac{N \cdot l}{(p_1 - p_2)}$$

where P, the permeability coefficient expressed in Barrer, $p_1$ and $p_2$ are the feed and permeate side pressure (cm Hg), l is the membrane thickness (cm) and N is the steady-state penetrant flux ($cm^3 \cdot cm^{-2} \cdot sec^{-1}$). The permeability measurements were repeated for three samples prepared under identical conditions and the data averaged as given in Table 7.1-7.3.

TABLE 6.1

Solubility coefficient (S)[a] and solubility selectivity ($S_A/S_B$) of PFILs based on PBI-I.

| PFIL | Solubility Coefficient | | | | Solubility selectivity | | | | |
|---|---|---|---|---|---|---|---|---|---|
| | $S_{H_2}$ | $S_{N_2}$ | $S_{CH_4}$ | $S_{CO_2}$ | $S_{H_2}/S_{N_2}$ | $S_{N_2}/S_{CH_4}$ | $S_{CO_2}/S_{H_2}$ | $S_{CO_2}/S_{N_2}$ | $S_{CO_2}/S_{CH_4}$ |
| PBI-I | 0.37 | 0.40 | 0.45 | 1.42 | 0.93 | 0.89 | 3.84 | 3.53 | 3.16 |
| [TMPBI-I][I] | 0.38 | 0.41 | 0.66 | 1.73 | 0.93 | 0.62 | 4.55 | 4.22 | 2.62 |
| [TMPBI-I][$BF_4$] | 0.45 | 0.51 | 0.64 | 2.19 | 0.88 | 0.80 | 4.87 | 4.29 | 3.42 |
| [TMPBI-I][$Tf_2N$] | 0.41 | 0.38 | 0.39 | 1.34 | 1.08 | 0.97 | 3.27 | 3.53 | 3.44 |

[a]Expressed in $cm^3$ (STP)/$cm^3$ polymer.atm.

TABLE 6.2

Solubility coefficient (S)[a] and solubility selectivity ($S_A/S_B$) of PFILs based on PBI-BuI.

| PFIL | Solubility Coefficient | | | | Solubility selectivity | | | | |
|---|---|---|---|---|---|---|---|---|---|
| | $S_{H_2}$ | $S_{N_2}$ | $S_{CH_4}$ | $S_{CO_2}$ | $S_{H_2}/S_{N_2}$ | $S_{N_2}/S_{CH_4}$ | $S_{CO_2}/S_{H_2}$ | $S_{CO_2}/S_{N_2}$ | $S_{CO_2}/S_{CH_4}$ |
| PBI-BuI | 0.33 | 0.57 | 1.04 | 2.24 | 0.58 | 0.55 | 6.79 | 3.93 | 2.15 |
| [TMPBI-BuI][I] | 0.40 | 0.34 | 0.81 | 2.22 | 1.18 | 0.42 | 5.55 | 6.53 | 2.74 |
| [TMPBI-BuI][Ac] | 0.34 | 0.23 | 0.33 | 2.95 | 1.48 | 0.70 | 8.68 | 12.83 | 8.94 |
| [TMPBI-BuI][TFAc] | 0.26 | 0.22 | 0.34 | 1.72 | 1.18 | 0.65 | 6.62 | 7.82 | 5.06 |
| [TMPBI-BuI][HFB] | 0.33 | 0.23 | 0.33 | 1.37 | 1.43 | 0.70 | 4.15 | 5.96 | 4.15 |
| [TMPBI-BuI][MS] | 0.33 | 0.28 | 0.31 | 1.66 | 1.18 | 0.90 | 5.03 | 5.93 | 5.35 |
| [TMPBI-BuI][TFMS] | 0.21 | 0.35 | 0.38 | 1.79 | 0.60 | 0.92 | 8.52 | 5.11 | 4.71 |
| [TMPBI-BuI][PTS] | 0.23 | 0.07 | 0.19 | 0.75 | 3.29 | 0.37 | 3.26 | 10.71 | 3.95 |
| [TMPBI-BuI][Bz] | 0.41 | 0.35 | 0.34 | 0.94 | 1.17 | 1.03 | 2.29 | 2.69 | 2.76 |
| [TMPBI-BuI][$NO_3$] | 0.54 | 0.48 | 0.58 | 1.53 | 1.13 | 0.83 | 2.83 | 3.19 | 2.64 |
| [TMPBI-BuI][$BF_4$] | 0.23 | 0.38 | 0.58 | 2.46 | 0.61 | 0.66 | 10.70 | 6.47 | 4.24 |
| [TMPBI-BuI][$Tf_2N$] | 0.25 | 0.29 | 0.34 | 1.84 | 0.86 | 0.85 | 7.36 | 6.34 | 5.41 |

[a]Expressed in $cm^3$ (STP)/$cm^3$ polymer.atm.

TABLE 6.3

Solubility coefficient (S)[a] and solubility selectivity ($S_A/S_B$) of PFILs based on ABPBI.

| PFIL | Solubility Coefficient | | | | Solubility selectivity | | | | |
|---|---|---|---|---|---|---|---|---|---|
| | $S_{H_2}$ | $S_{N_2}$ | $S_{CH_4}$ | $S_{CO_2}$ | $S_{H_2}/S_{N_2}$ | $S_{N_2}/S_{CH_4}$ | $S_{CO_2}/S_{H_2}$ | $S_{CO_2}/S_{N_2}$ | $S_{CO_2}/S_{CH_4}$ |
| ABPBI | 0.23 | 0.14 | 0.08 | 0.33 | 1.64 | 1.75 | 1.43 | 2.36 | 4.13 |
| [DMABPBI][I] | 0.25 | 0.24 | 0.27 | 0.97 | 1.04 | 0.89 | 3.88 | 4.04 | 3.59 |
| [DMABPBI][$BF_4$] | 0.44 | 0.48 | 0.58 | 1.99 | 0.92 | 0.83 | 4.52 | 4.15 | 3.43 |

[a]Expressed in $cm^3$ (STP)/$cm^3$ polymer.atm.

TABLE 7.1

Permeability coefficient (P)[a] and permselectivity ($P_A/P_B$)[b] of PFILs based on PBI-I.

| PFIL | Permeability Coefficient | | | | | Permselectivity | | | | | | | | |
|---|---|---|---|---|---|---|---|---|---|---|---|---|---|---|
| | $P_{He}$ | $P_{H_2}$ | $P_{N_2}$ | $P_{CH_4}$ | $P_{CO_2}$ | $P_{He}/P_{H_2}$ | $P_{He}/P_{N_2}$ | $P_{He}/P_{CH_4}$ | $P_{H_2}/P_{N_2}$ | $P_{H_2}/P_{CH_4}$ | $P_{H_2}/P_{CO_2}$ | $P_{CO_2}/P_{N_2}$ | $P_{CO_2}/P_{CH_4}$ | $P_{N_2}/P_{CH_4}$ |
| PBI-I | 1.05 | 0.6 | 0.0048 | 0.0018 | 0.16 | 1.8 | 219 | 583 | 125 | 333 | 3.8 | 33 | 89 | 2.7 |
| [TMPBI-I] [I$_{25}$] | 1.2 | 0.7 | — | — | — | 1.6 | — | — | — | — | — | — | — | — |
| [TMPBI-I] [I$_{50}$] | 1.2 | 1.1 | — | — | 0.5 | 1.1 | — | — | — | — | 2.3 | — | — | — |
| [TMPBI-I] [I$_{75}$] | 1.3 | 1.3 | — | — | 0.3 | 0.9 | — | — | — | — | 5.5 | — | — | — |
| [TMPBI-I][I] | 1.53 | 1.36 | 0.003 | — | 0.25 | 1.1 | 494 | — | 439 | — | 5.4 | 81 | — | — |
| [TMPBI-I][BF$_4$] | 7.56 | 5.51 | 0.048 | 0.013 | 1.02 | 1.4 | 158 | 582 | 115 | 424 | 5.4 | 21 | 79 | 3.7 |
| [TMPBI-I][Tf$_2$N] | 17.7 | 10.3 | 0.35 | 0.14 | 8.2 | 1.7 | 51 | 126 | 29 | 74 | 1.3 | 23 | 59 | 2.5 |
| [TMPBI-I] [TFMS$_{25}$] | 2.7 | 0.8 | — | — | 0.3 | 3.2 | — | — | — | — | 2.8 | — | — | — |
| [TMPBI-I] [TFMS$_{50}$] | 3.2 | 3.6 | — | — | 1.6 | 0.9 | — | — | — | — | 2.3 | — | — | — |
| [TMPBI-I] [TFMS$_{75}$] | 9.1 | 6.8 | — | — | 1.6 | 1.3 | — | — | — | — | 4.4 | — | — | — |
| [TMPBI-I] [TFMS] | 4.8 | 2.9 | — | — | 1.5 | 1.7 | — | — | — | — | 1.9 | — | — | — |

[a]Determined at 20 atm upstream pressure, expressed in Barrer (1 Barrer = $10^{-10}$ cm$^3$(STP) · cm/cm$^2$ · s · cm Hg)
[b]Ratio of pure gas permeability.

TABLE 7.2

Permeability coefficient (P)[a] and permselectivity ($P_A/P_B$)[b] of PFILs based on PBI-BuI.

| | Permeability Coefficient | | | | | Permselectivity | | | | | | | | |
|---|---|---|---|---|---|---|---|---|---|---|---|---|---|---|
| | $P_{He}$ | $P_{H_2}$ | $P_{N_2}$ | $P_{CH_4}$ | $P_{CO_2}$ | $P_{He}/P_{H_2}$ | $P_{He}/P_{N_2}$ | $P_{He}/P_{CH_4}$ | $P_{H_2}/P_{N_2}$ | $P_{H_2}/P_{CH_4}$ | $P_{H_2}/P_{CO_2}$ | $P_{CO_2}/P_{N_2}$ | $P_{CO_2}/P_{CH_4}$ | $P_{N_2}/P_{CH_4}$ |
| PBI-BuI | 10.1 | 10.7 | 0.06 | 0.05 | 1.91 | 0.9 | 168 | 202 | 178 | 214 | 5.6 | 32 | 38 | 1.2 |
| [TMPBI-BuI] [I$_{25}$] | 10.51 | 13.34 | — | — | 3.24 | 0.78 | — | — | — | — | 4.1 | — | — | — |
| [TMPBI-BuI] [I$_{50}$] | 3.51 | 4.41 | — | — | 1.79 | 0.79 | — | — | — | — | 2.4 | — | — | — |
| [TMPBI-BuI] [I$_{75}$] | 4.26 | 4.78 | — | — | 1.79 | 0.89 | — | — | — | — | 2.6 | — | — | — |
| [TMPBI-BuI][I] | 5.0 | 6.3 | 0.06 | 0.05 | 1.84 | 0.8 | 83 | 100 | 105 | 126 | 3.4 | 31 | 37 | 1.2 |
| [TMPBI-BuI][TFAc] | 6.9 | 4.93 | 0.13 | 0.03 | 2.16 | 1.4 | 53 | 200 | 38 | 144 | 2.3 | 17 | 63 | 3.8 |
| [TMPBI-BuI][HFB] | 19.8 | 10.9 | 0.49 | 0.21 | 6.52 | 1.8 | 40 | 95 | 22 | 52 | 1.7 | 13 | 31 | 2.4 |
| [TMPBI-BuI][MS] | 2.1 | 1.4 | 0.03 | 0.01 | 1.56 | 1.5 | 75 | 185 | 49 | 121 | 0.9 | 55 | 137 | 2.5 |
| [TMPBI-BuI][TFMS$_{25}$] | 13.26 | 12.69 | — | — | 5.94 | 1.04 | — | — | — | — | 2.13 | — | — | — |
| [TMPBI-BuI] [TFMS$_{50}$] | 10.56 | 8.97 | — | — | 2.90 | 1.17 | — | — | — | — | 3.08 | — | — | — |
| [TMPBI-BuI] [TFMS$_{75}$] | 11.32 | 8.55 | — | — | 5.51 | 1.32 | — | — | — | — | 1.55 | — | — | — |
| [TMPBI-BuI][TFMS] | 11.7 | 9.4 | 0.23 | 0.12 | 4.80 | 1.2 | 50 | 98 | 40 | 79 | 2.0 | 21 | 40 | 2.0 |
| [TMPBI-BuI][PTS] | 2.3 | 1.3 | 0.02 | 0.00 | 0.58 | 1.7 | 121 | 528 | 71 | 309 | 2.3 | 31 | 134 | 4.4 |
| [TMPBI-BuI][NO$_3$] | 3.3 | 3.1 | 0.09 | 0.05 | 3.43 | 1.1 | 38 | 63 | 35 | 58 | 0.9 | 39 | 65 | 1.7 |
| [TMPBI-BuI][BF$_4$] | 9.07 | 6.91 | 0.20 | 0.10 | 4.80 | 1.3 | 45 | 91 | 35 | 69 | 1.4 | 24 | 48 | 2.0 |
| [TMPBI-BuI][Tf$_2$N] | 26 | 18.3 | 0.78 | 0.42 | 17.9 | 1.4 | 33 | 62 | 24 | 44 | 1.0 | 23 | 43 | 1.9 |

[a]Determined at 20 atm upstream pressure, expressed in Barrer (1 Barrer = $10^{-10}$ cm$^3$(STP) · cm/cm$^2$ · s · cm Hg)
[b]Ratio of pure gas permeability.

TABLE 7.3

Permeability coefficient (P)[a] and permselectivity ($P_A/P_B$)[b] of PFILs based on ABPBI.

| PFIL | Permeability Coefficient | | | | | Permselectivity | | | | | | | | |
|---|---|---|---|---|---|---|---|---|---|---|---|---|---|---|
| | $P_{He}$ | $P_{H_2}$ | $P_{N_2}$ | $P_{CH_4}$ | $P_{CO_2}$ | $P_{He}/P_{H_2}$ | $P_{He}/P_{N_2}$ | $P_{He}/P_{CH_4}$ | $P_{H_2}/P_{N_2}$ | $P_{H_2}/P_{CH_4}$ | $P_{H_2}/P_{CO_2}$ | $P_{CO_2}/P_{N_2}$ | $P_{CO_2}/P_{CH_4}$ | $P_{N_2}/P_{CH_4}$ |
| [DMABPBI][I] | 1.63 | 1.58 | 0.0052 | 0.0025 | 0.13 | 1.0 | 314 | 652 | 304 | 632 | 12.2 | 25 | 52 | 2.1 |
| [DMPBI][BF$_4$] | 5.49 | 2.53 | 0.019 | 0.012 | 0.42 | 2.2 | 289 | 458 | 133 | 211 | 6.0 | 22 | 35 | 1.6 |

[a]Determined at 20 atm upstream pressure, expressed in Barrer (1 Barrer = $10^{-10}$ cm$^3$(STP) · cm/cm$^2$ · s · cm Hg)
[b]Ratio of pure gas permeability.

We claim:
1. Polybenzimidazole (PBI) based polymeric forms of ionic liquids of formula III and IV wherein A,B are repeat units;

$R_1$ and $R_2$ is same or different and are each selected from the group consisting of C1-$C_{20}$ alkyl, trialkyl silyl, cyclo alkyl, aryl, arylene, alkylene, or heterocyclic ring such as pyridine, pyrazine, furan, quinoline or thiophene groups as straight chain, branched, cyclic, aromatic, and derivatives thereof substituted with functional groups such as halo, nitro, ether, aldehyde, ketone, hydroxyl, carboxylic, sulfonic or ester;

X''' is selected from $(C_nH_{2n+1})COO$, haloacetate, $(CnF_{2n+1})COO$, ArCOO, where Ar may be substituted or unsubstituted, $(C_nH_{2n+1})SO_3$, $(CnF_{2n+1})SO_3$, $ArSO_3$, where Ar may be substituted or unsubstituted aromatic moiety, $NO_3$, $NO_2$, $PO_3$, $BF_4$, $HPO_4^-N(SO_2CF_3)_2$, $H_2PO_4$, $HSO_4$, $S_2O_3$, ClO, $BrO_3$, $CrO_4$, $HCO_3$, $C_2O_4$, $MnO_4$, $NH_2$, $FeCl_4^-$, $PF_6^-$, $(CN)_2N^-$, $C_{16}H_{34}PO_4^-$, $C_{12}H_{25}C_6H_4O_3^-$, $SCN^-$, $CH_2=CHCOOCH_2CH_2CH_2SO_3^-$, $CH_2=CHSO_3^-$, $C_6H_4CO_3SN^-$, o-tosylate, Pyrazolium anion, Imadaolium anion, Triazole anion, Tetrazole anion, Oxazole anion, Indolium anion, Benztriazole anion, Phenoxide anion, $N(SO_2(C_nF_{2n+1}))_2$ bis((perfluoroethyl) sulfonyl) imide (BETU), Diethylenglykolmonomethylethersulphate (MDEGSO4$^-$), alkylylsulfate $(C_nH_{2n+1})SO_4^-$ fluoroalkylylsulfate $(C_nF_{2n+1})SO_4^-$ Tetracyanoborate $(B(CN)_4^-)$, Tetrafluorosuccinate, Hexafluoroglutarate, Oxalate, Malonate, Glycolate, L-Tartrate, Maleate, Mucobromate, Nitrilotriacetate, 5-Aminotetrazolate, DL-Tartrate, Lactate, Gluconate, DL-Malate, or mixture thereof.

wherein R is a tetraamine monomer having structure formula V(a)-V(f)

wherein structure formula V(a)-$R_1$, $R_2$=H, $CH_3$, $CF_3$, F, Cl, Br, I, $NO_2$ or $C_{1-24}$ containing alkyl or aryl groups, wherein structure formula V(b)-$R_1$, $R_2$, $R_3$, $R_4$=H, $CH_3$, $CF_3$, F, Cl, Br, I, $NO_2$ or $C_{1-24}$ alkyl or aryl groups, wherein structure formula V(c)-$R_1$, $R_2$, $R_3$, $R_4$=H, $CH_3$, $CF_3$, F, Cl, Br, I, $NO_2$ or $C_{1-24}$ alkyl or aryl groups, wherein structure formula V(d)-$R_1$, $R_2$, $R_3$, $R_4$=H, $CH_3$, $CF_3$, F, Cl, Br, I, $NO_2$ or $C_{1-24}$ alkyl or aryl groups, wherein structure formula V(e)-, $R_1$, $R_2$, $R_3$, $R_4$=H, $CH_3$, $CF_3$, F, Cl, Br, I, $NO_2$ or $C_{1-24}$ alkyl or aryl groups and X can be any of the following: —$CH_2$—, —O—, —$SO_2$—, —$C(CH_3)_2$—, —$C(CF_3)_2$—, —$C(Ph)_2$-, —$CH_3C(Ph)$-, —$CH_3C$(isopropyl)-, —$CH_3C$(t-butyl)-, —$CH_3C$(n-propyl)-, —$CH_3C$(ethyl)- or any other $C_{1-24}$ containing alkyl or aryl groups, and R' of Formula III and IV is dicarboxylic acid as shown in structure VI:

$$HOOC-(C_kH_mX_n)-COOH \qquad VI$$

wherein k=1-30 containing alkyl, aryl, aromatic, arylene, alkylene, arylene-ether or heterocyclic ring such as pyridine, pyrazine, furan, quinoline or thiophene groups as straight chain, branched, cyclic, aromatic or combination of these; X=H, O, N, S, halogen or combination thereof, n=0-10 and m=appropriate numbers of hydrogens.

2. The polybenzimidazole (PBI) based polymeric forms of ionic liquids of formula III and IV as claimed in claim 1 wherein the molar fraction of A is from 0-99% and that of B is 1 to 100%.

3. The polybenzimidazole (PBI) based polymeric forms of ionic liquids according to claim 1, wherein said polymeric forms of ionic liquids have an ability to form films, sheets, granules, flakes, powders.

4. The polybenzimidazole (PBI) based polymeric forms of ionic liquids according to claim 1, for use as separating media in membrane, sorbent, extraction, chromatography, as polymer electrolytes in devices selected from fuel cell, batteries, supercapacitor, solar cell, as dispersing agents, as nanomaterials, as microwave absorbing materials in electrowetting, water breathable fabrics.

5. A process for preparation of polybenzimidazole (PBI) based polymeric forms of ionic liquids according to claim 1 comprising:
a. reacting PBI of formula I or II with metal hydride to obtain corresponding metal salt of PBI;

b) treating the metal salt of PBI as obtained in step (a) with reagent $R_1X'$ or $R_2X''$ wherein $R_1$ and $R_2$ is same or different and are each selected from the group consisting of $C_1$-$C_{20}$ alkyl, trialkyl silyl, cyclo alkyl, aryl, arylene, alkylene, or heterocyclic ring such as pyridine, pyrazine, furan, quinoline or thiophene groups as straight chain, branched, cyclic, aromatic, and derivatives thereof substituted with functional groups such as halo, nitro, ether, aldehyde, ketone, hydroxyl, carboxylic, sulfonic or ester, X' and X" are selected from the group consisting of I, Cl, Br, F, $NO_2$ to obtain N-quaternized form of PBI of formula III and IV and c) anion exchange of N-quaternized form of PBI of step (b) by treating with metal salts to obtain polymeric forms of ionic liquids of formula III and IV.

6. The process according to claim 5, wherein, the degree of N-quarternization is in the range of 1% to 100%.

7. The process according to claim 5, wherein the metal salts are selected from silver tetrafluoroborate, sodium tetrafluoroborate lithium bis(trifluoromethane)sulfonamide, silver acetate, sodium acetate, silver haloacetate, sodium haloacetate, silver tirfluroacetate, sodium trifluoroacetate, silver heptafluro butyrate, sodium heptafluro butyrate, silver methane sulphonate, sodium methanesulfonate, silver trifluromethane sulphonate, sodium trifluromethane sulphonate silver p-toluene sulphonate, sodium p-toluene sulphonate silver benzoate, sodium benzoate, silver nitrate, sodium nitrate, silver tetrafluoroborate, silver amide, lithium bis(trifluoromethane)sulfonamide, lithium nitrate, lithium nitrite, lithium bromide. Lithium sulphate, lithium sulfite, lithium amide, lithium chlorite, lithium hypochlorite, lithium oxalate, lithium formate monohydrate; metal salt of $FeCl_4^-$, $PF_6^-$, $(CN)_{2N}^-$, $C_{16H34P}O_4^-$, $C_{12H25C6H4O3}^-$, $SCN^-$, $CH_2=CHCOOCH_{2C}H_{2C}H_{2S}O_3^-$, $CH_2=CHSO_3^-$, $C_{6H4C}O_{3S}N^-$, o-tosylate, pyrazolium anion, imadaolium anion, triazole anion, tetrazole anion, oxazole anion, indolium anion, benztriazole anion, phenoxide anion, $N(SO_2(C_{nF2n+1}))_2$ bis(perfluoroethyl)sulfonyl)imide (BETU), diethylenglykolmonomethylethersulphate (MDEGSO$_4$__), alkylylsulfate $(C_{nH2n+1})SO_4$__, fluoroalkylylsulfate $(C_{nF2n+1})SO_4$__tetracyanoborate $(B(CN)_4$__), tetrafluorosuccinate, hexafluoroglutarate, oxalate, malonate, glycolate, L-tartrate, maleate, mucobromate, nitrilotriacetate, 5-aminotetrazolate, DL-tartrate, lactate, gluconate, malate, or mixture thereof.

* * * * *